United States Patent
Slattery et al.

(10) Patent No.: US 7,621,112 B2
(45) Date of Patent: Nov. 24, 2009

(54) FORESTRY MACHINE WITH HYDRAULIC SYSTEM AND METHOD FOR ROTOR BRAKING

(75) Inventors: Michael S. Slattery, Maineville, OH (US); Robert G. Hentz, Hamilton, OH (US)

(73) Assignee: Fecon, Inc., Lebanon, OH (US)

( * ) Notice: Subject to any disclaimer, the term of this patent is extended or adjusted under 35 U.S.C. 154(b) by 606 days.

(21) Appl. No.: 11/174,244

(22) Filed: Jul. 1, 2005

(65) Prior Publication Data

US 2006/0032222 A1    Feb. 16, 2006

Related U.S. Application Data

(60) Provisional application No. 60/585,148, filed on Jul. 2, 2004.

(51) Int. Cl.
   *A01D 69/00* (2006.01)
(52) U.S. Cl. .................. 56/11.9; 56/11.3; 144/429
(58) Field of Classification Search .................. 56/11.9, 56/DIG. 11, 11.3; 60/326–494, 460, 468; 144/427–429
   See application file for complete search history.

(56) References Cited

U.S. PATENT DOCUMENTS

| | | | |
|---|---|---|---|
| 3,015,316 A * | 1/1962 | Thomas ................ | 91/420 |
| 3,989,198 A | 11/1976 | Blasko | |
| 4,148,366 A | 4/1979 | Beckstrom et al. | |
| 4,168,757 A | 9/1979 | Mather et al. | |
| 4,209,058 A * | 6/1980 | Spalding ................ | 164/100 |
| 4,209,071 A | 6/1980 | Schuck | |
| 4,222,418 A | 9/1980 | McCray et al. | |
| 4,223,441 A | 9/1980 | Everts | |
| 4,338,856 A | 7/1982 | Smilges et al. | |
| 4,996,783 A | 3/1991 | Fresia | |
| 5,101,630 A * | 4/1992 | Wagenseil ................ | 60/460 |

(Continued)

FOREIGN PATENT DOCUMENTS

DE    3907960    9/1990

OTHER PUBLICATIONS

Sun Hydraulics Corp., *5:1 pilot ratio, Standard, Counterbalance valve*, printed Jun. 24, 2004 from www.sunhydraulics.com, Sun Hydraulics, Corporation © 2003.

(Continued)

*Primary Examiner*—Alicia M Torres
(74) *Attorney, Agent, or Firm*—Dinsmore & Shohl LLP

(57) ABSTRACT

Embodiments relate to braking high-speed rotational cutting equipment. In particular, some embodiments relate to forestry machinery having a cutting or mower apparatus, and further having a hydraulic brake. The brake includes a counterbalance valve which pressurizes fluid at the motor outlet to a predetermined level when flow of hydraulic fluid from a pump to a motor is discontinued. The hydraulic brake may include a restrictor orifice to reduce sudden pressure increases on the motor. The predetermined pressure level may be between about 2000 psi and about 4000 psi and the orifice may have a diameter of between about 0.025 and 0.040 inches. The counterbalance vent port can hydraulically connect to the motor case line. An anti-cavitation valve can be at the counterbalance valve port and can supply fluid to the motor inlet after the flow from the pump discontinues. Additional embodiments include related hydraulic control systems and methods.

6 Claims, 6 Drawing Sheets

U.S. PATENT DOCUMENTS 5,197,284 A * 3/1993 Cartner ................... 60/466
5,222,875 A * 6/1993 Clark ..................... 417/390
5,813,792 A 9/1998 Edwards
6,539,712 B2 * 4/2003 Konishi et al. ............ 60/460

OTHER PUBLICATIONS

English abstract of DE3907960.
PCT International Search Report and Written Opinion dated Jun. 30, 2008 for International application No. PCT/US2005/023443.

* cited by examiner

FORESTRY MACHINE WITH HYDRAULIC SYSTEM AND METHOD FOR ROTOR BRAKING

CROSS REFERENCE TO RELATED APPLICATION

This application claims the benefit of U.S. Provisional Application No. 60/585,148, filed Jul. 2, 2004, the entire disclosure of which is hereby incorporated herein by reference.

TECHNICAL FIELD

The present application relates generally to safely braking of rotating equipment, and more specifically to forestry equipment and hydraulic systems and methods for rotor braking.

BACKGROUND

Forestry machines are utilized for clearing land, creating paths, and otherwise removing debris, brush, trees, and/or vegetation, making the land suitable for further development or use. To carry out these tasks, such machines can be fitted with mulching or cutting apparatus for shredding vegetation, brush, trees, stumps, and other materials. In particular, the mulching apparatus may be integrally or detachably attached to a tractor, skid steer, or other forestry vehicle to facilitate articulation and movement of the mowing apparatus with respect to the vegetation. Often, the vehicle is a multi-purpose vehicle having the capability to be fitted with any of a variety of attachments suitable for the task at hand. For example, the vehicle can include a common connection for connecting to and driving mulching attachments such as brush cutters, rotary mowers, shredders, grinders, and crushers. Such mulching attachments can be hydraulically driven via hydraulic power from the vehicle. One illustrative type of mulching apparatus is known as a "flail mower" which utilizes a rotatable axle with either a swinging or fixed position cutting tool (often known as "flails").

The axles of such apparatus typically rotate at speeds in excess of 1000 rpm and as high as 2200 rpm. Due to the high rotating speed of the axle of a mowing apparatus, the axle may continue rotating for extended periods of time after power shutoff. Accordingly, even after power shutoff, it is possible for an operator to climb out and contact the rotating shredding tool (e.g., the flails) while the axle continues to rotate. This risk is particularly high where there is a close proximity of the mulching attachment to the exit door of the vehicle cab, which is often the case. Any contact with the flails associated with a rotating axle might result in severe injury or death.

In order to avoid inadvertent contact with rotating flails, the axle may be slowed to a stop by shutting off the power and then moving the mulching apparatus until the flails engage the earth or other blunt object. Alternatively, the operator may wait an extended period of time after shutting off power until the axle stops rotating. However, operator error during normal or emergency situations may result in inadvertent or unavoidable contact with flails that are rotating dangerously with the axle.

While disc and caliper braking systems could be utilized upon shut down, such systems require parts that can wear quickly and therefore increase operating costs and create increased maintenance requirements. Likewise, such systems can require operator action to engage the brake in order to slow the rotor. Accordingly, it is desired to increase the safety of hydraulically driven rotating mulching or cutting apparatus, such as those used with forestry machines and with forestry vehicles.

Moreover, maintaining optimal pressures is often important in high-speed, hydraulically-driven rotational systems, to ensure optimal operation and prevent break down of the device. Accordingly, it is further desired to provide an automatic hydraulic rotor control system and method that is capable of quickly braking a high-speed hydraulic rotating apparatus, at optimal pressure levels.

SUMMARY

According to one embodiment, a hydraulic mower apparatus is provided, comprising a mower tool mounted on a rotor, and a hydraulic motor operable to drive the rotor in a first direction and having a motor inlet and a motor outlet (e.g., working ports). The apparatus includes a fluid circuit comprising at least one fluid supply line operable to supply hydraulic fluid to the motor inlet from a pump, and at least one fluid return line operable to return fluid from the motor outlet to a tank. The mower apparatus further comprises a hydraulic brake comprising a counterbalance valve arranged in the fluid return line, and an orifice arranged between the motor inlet and outlet. The counterbalance valve is operable to pressurize fluid at the motor outlet to a predetermined pressure level by continually opening and closing when a supply of hydraulic fluid to the motor inlet is discontinued to thereby brake the speed of the motor, and the orifice is operable to reduce sudden pressure increases on the motor when a supply of hydraulic fluid from the pump to the motor is discontinued and the counterbalance valve first closes. The mower apparatus further includes at least one valve hydraulically connected to the fluid return line and operable to direct the flow of fluid from the motor outlet to the motor inlet when the supply of hydraulic fluid from the pump to the motor is discontinued. The predetermined pressure level may between about 2000 psi and about 4000 psi, and the restrictor orifice may be located in a manifold block connected to the motor. The orifice may have a maximum cross-sectional dimension of from about 0.025 to about 0.040 inches, such as a diameter of about 0.03 inches. The motor can include a case line configured for routing of the hydraulic fluid through the motor casing, and the counterbalance valve can include a vent port hydraulically connected to the tank via the motor casing. The counterbalance valve can further include a pilot port hydraulically connected to the motor inlet, and a valve port hydraulically connected to the tank and configured for supply of hydraulic fluid to the tank during operation of the motor. The valve port is also hydraulically connected to the motor inlet and configured for supply of hydraulic fluid to the motor inlet when the pump ceases supplying hydraulic fluid to the motor.

According to another embodiment, a hydraulic rotary forestry machine is provided. The machine comprises a forestry vehicle including a hydraulic pump and hydraulic controls operable to selectively supply hydraulic fluid to a fluid supply line from the pump, and a cutting apparatus hydraulically operated via hydraulic fluid from the hydraulic pump of the vehicle. The cutting apparatus includes a hydraulic motor operable to drive a rotor in a first direction and including a motor inlet and motor outlet, a cutting tool mounted on the rotor, and a fluid circuit comprising at least one fluid supply line operable to supply hydraulic fluid to the motor and at least one fluid return line operable to return fluid from the hydraulic motor to a tank. The apparatus further includes a hydraulic brake comprising a counterbalance valve arranged in the fluid return line and operable to pressurize fluid at the motor outlet to a predetermined pressure level of between about 2000 psi and about 4000 psi when a flow of hydraulic fluid from the pump to the motor is discontinued. The counterbalance valve includes a pilot port hydraulically connected to the motor inlet, a valve port hydraulically connected to the tank and configured for supply of hydraulic fluid to the tank during operation of the motor, and a load port hydraulically connected to the motor outlet. The brake further includes at least one valve hydraulically connected to the valve port and operable to direct the flow of fluid from the motor outlet to the motor inlet when the supply of hydraulic fluid from the pump to the motor is discontinued. The hydraulic brake can reside in a metal manifold block detachable from the motor, and the counterbalance valve further can include a vent port routed to the tank via the motor casing. The hydraulic brake can further include a restrictor orifice arranged between the motor inlet and the motor outlet and operable to reduce sudden pressure increases on the motor when a supply of hydraulic fluid from the pump to the motor is discontinued. The orifice may have a maximum cross-sectional dimension of between about 0.025 and about 0.04 inches. The machine may also have a pressure relief valve configured to relieve pressure at the motor inlet when the cutting tool engages an obstruction to create high pressure at the motor, and at least one valve positioned between the fluid return line and the motor casing and operable to provide a cooling supply of fluid to the motor casing.

According to another embodiment, hydraulic rotor control system is also provided comprising a hydraulic motor operable to drive a rotor in a first direction and having an inlet and an outlet for hydraulic fluid. The system also includes a fluid circuit comprising at least one fluid supply line operable to supply hydraulic fluid to the motor inlet at least one fluid return line operable to return fluid from the motor outlet to a tank. The system further includes a hydraulic brake comprising a counterbalance valve positioned in the fluid return line, the counterbalance valve being operable to close a passage and to pressurize fluid at the motor outlet to a predetermined pressure level when a flow of hydraulic fluid from the pump to the motor is discontinued, as well as a restrictor orifice arranged between the motor inlet and the motor outlet and operable to reduce sudden pressure increases on the motor when a supply of hydraulic fluid from the pump to the motor is discontinued and the counterbalance valve closes. The predetermined pressure level may be between about 2000 psi (pounds per square inch) and about 4000 psi, such as about 2000 psi. The restrictor orifice may be located in a manifold block connected to the motor, and may have a maximum cross-sectional dimension of from about 0.025 to about 0.040 inches, such as a diameter of about 0.03 inches. The motor can include a case line configured for routing of the hydraulic fluid through the motor casing, and the counterbalance valve can include a vent port hydraulically connected to the tank via the motor casing. The counterbalance valve can further include a pilot port hydraulically connected to the motor inlet, and a valve port hydraulically connected to the tank and configured for supply of hydraulic fluid to the tank during operation of the motor. The valve port can be hydraulically connected to the motor inlet and configured for supply of hydraulic fluid to the motor inlet when the pump ceases supplying hydraulic fluid to the motor. An anti-cavitation check valve can be positioned between the valve port and the fluid supply line, and can be operable to allow hydraulic fluid to be supplied to the inlet port of the motor after the flow of fluid from the pump is discontinued. The system can include a pressure spike relief valve configured to relieve pressure spikes during operation of the motor, and a check valve positioned along the fluid return line and operable to prevent flow of hydraulic fluid to the tank when the supply of fluid from the pump is discontinued, as well as a valve positioned between the fluid return line and the motor and configured to provide a supply of hydraulic fluid to the motor casing for cooling the motor.

According to another embodiment, a method for braking a hydraulic motor is provided, the method comprising pumping hydraulic fluid through a motor for operation of the motor, and in response to the pumping of fluid through the motor, opening a passage to allow the fluid to flow through a return line to a tank. The method further comprises ceasing the pumping of hydraulic fluid through the motor, and after the ceasing of the pumping of hydraulic fluid, closing the passage to provide a hydraulic pressure on the motor outlet to thereby provide a braking force on the motor. In addition, the method comprises preventing the flow of fluid from the return line to the tank, and successively opening and closing the passage as the motor slows to allow hydraulic fluid to travel from the motor outlet to the motor inlet through a first route to thereby maintain a predetermined pressure, wherein the predetermined pressure is from about 2000 psi to about 4000 psi. The method may further comprise, upon closing the passage, allowing fluid to flow through a first route from the motor outlet to the motor inlet to thereby minimize pressure spike caused by the closing of the passage. The passage may reside in a counterbalance valve.

Aspects of the present invention will become apparent to those skilled in this art from the following description wherein there is shown and described embodiments of the invention, solely for the purposes of illustration and example. As will be realized, other different aspects and embodiments can be provided without departing from the scope of the invention. Accordingly, the drawings and descriptions herein are illustrative in nature and not restrictive in nature.

BRIEF DESCRIPTION OF THE DRAWINGS

The accompanying drawings, incorporated in and forming part of the specification, depict illustrative embodiments, which, together with their descriptions, serve to explain principles of the present inventions. In the drawings.

Figure 1:
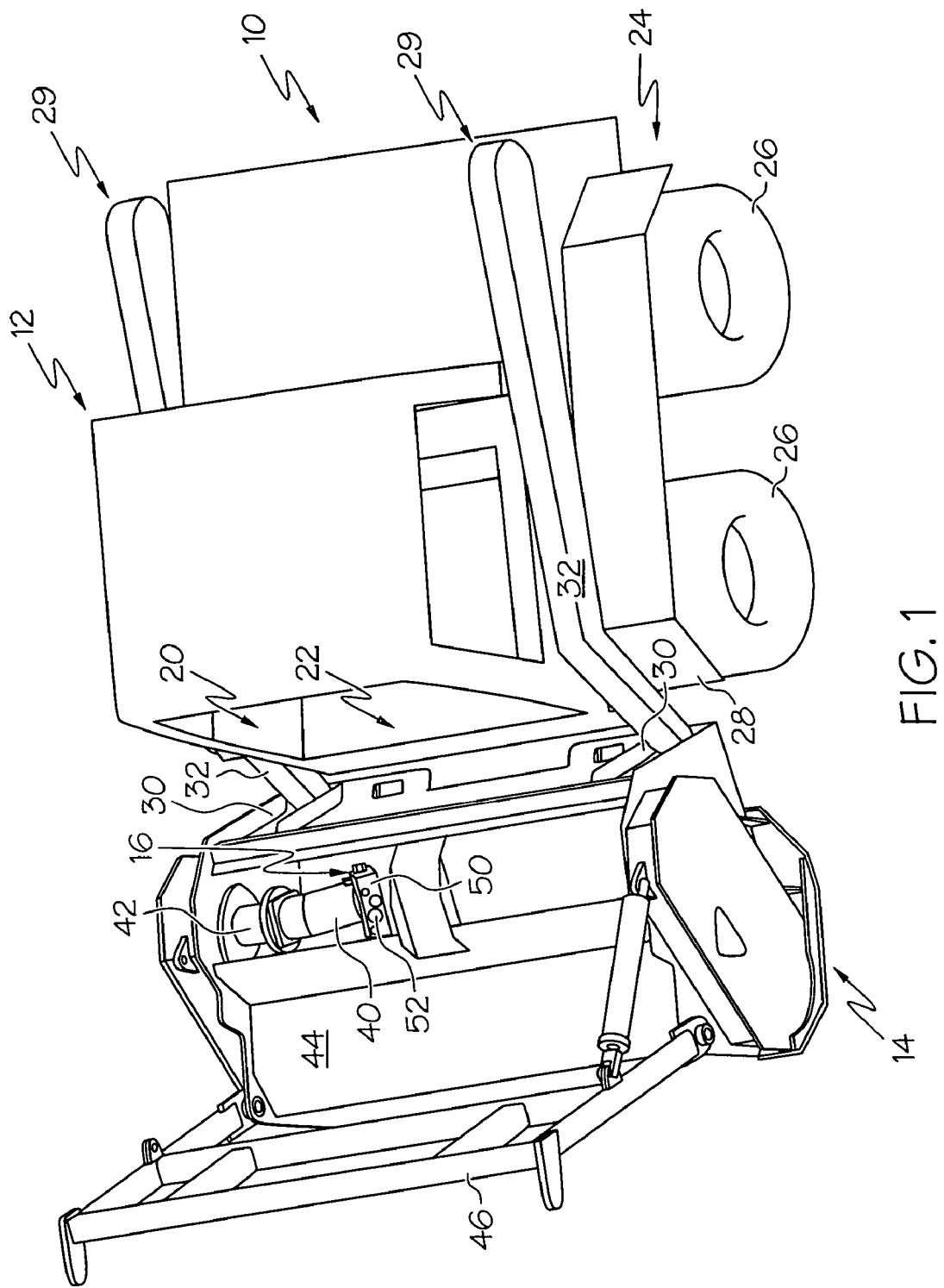
FIG. 1 is a top perspective view of an embodiment of a forestry machine including a forestry vehicle, a mulching apparatus with hydraulic motor, and a hydraulic brake, made and operating according to aspects of the present invention.

The embodiments set forth in the drawing are illustrative in nature and are not intended to be limiting of the invention defined by the claims. Moreover, individual features of the drawing and the invention will be more fully apparent and understood in view of the detailed description below.

DETAILED DESCRIPTION OF ILLUSTRATIVE EMBODIMENTS

In general, embodiments of the invention described below relate to braking high-speed rotational cutting equipment. In particular, some embodiments of the invention relate to a forestry machine having a cutting or mower apparatus, such as a mulching apparatus for example, and further having a hydraulic brake. The brake includes a counterbalance valve which pressurizes fluid at the motor outlet to a predetermined level when flow of hydraulic fluid from a pump to a motor is discontinued, so as to slow the mower tool upon shut down. The hydraulic brake may include a restrictor orifice, which can be located in a manifold block for example, and providing a passage between the motor inlet and outlet to reduce sudden pressure increases on the motor when a supply of hydraulic fluid from the pump to the motor is discontinued and the counterbalance valve closes. The predetermined pressure level may be between about 2000 psi and about 4000 psi, and in particular may be about 2000 psi. The motor can include a case line configured for routing hydraulic fluid through the motor casing for cooling, and the counterbalance valve can include a vent port hydraulically connected to the tank via the motor casing. The hydraulic brake can also include an anti-cavitation check valve positioned between a valve port of the counterbalance valve and the fluid supply line and operable to allow hydraulic fluid to be supplied to the inlet port of the motor after the flow of fluid from the pump is discontinued. A pressure spike relief valve can also be provided to relieve pressure spikes during operation of the motor, such as can occur when the rotating apparatus comes into abrupt contact with an object. A forestry vehicle having a hydraulic pump, a hydraulic connection, and hydraulic controls, may connect to the cutting apparatus for control and movement of the apparatus. Additional embodiments of the invention include hydraulic control systems and methods.

FIG. 1 is a top perspective view of an embodiment of a forestry machine 10 including a forestry vehicle 12, a mulching apparatus 14, and a hydraulic brake 16, made and operating according to principles of the present invention. In this example, the forestry vehicle 12 is a skid steer vehicle suitable for off-road travel, and includes a driver station 20 as well as an all-terrain wheel assembly 24. The wheel assembly can include tires 26 which can drive all-terrain tracks 28, and provides traction for the vehicle 12 to move over a variety of terrains and in a variety of conditions. The vehicle 12 also includes a hydraulically operated vertical lift assembly 29, for vertically lifting the attachment 14, and any other attachments that may be used with the vehicle. Controls 22 can be provided for control of the hydraulic lift assembly 29, as well as for controlling the power provided to the wheel assembly 24 and for controlling the operation of the attachment 14.

While the forestry vehicle is shown in this example as a skid steer vehicle, other suitable all-terrain vehicles with capability for utilizing a hydraulic motor attachment or tool could be provided, such as mini-track loaders, excavators, backhoes, and other such work vehicles. Further examples of suitable skid steer vehicles are shown and described in U.S. Pat. Nos. 4,168,757 and 4,209,071, the entire disclosures of which are hereby incorporated by reference herein.

In the example of FIG. 1, the attachment 14 comprises a mulching attachment which is removably connectable to the vehicle 12, although other hydraulically-operated rotary mowing or cutting attachments may be utilized, integral with or detachable from vehicle 12. The connection between the attachment 14 and the vehicle 12 can be accomplished in any of a variety of manners, such as by providing receptacles 30 for receiving vertical lift arms 32 from the vehicle 12. The attachment 14 in this example further includes a hydraulic supply connection for receiving an operating supply of hydraulic fluid from a pump within the vehicle, and a hydraulic return connection for returning hydraulic fluid to a tank within the vehicle 12. Other configurations are also possible, such as where the fluid pump and tank are located at other locations. Connection, powering, and movement of the attachment 14 can be accomplished with various configurations, such as those described in U.S. Pat. Nos. 4,148,366, and 5,813,792, for example, which are hereby incorporated herein by reference.

The mulching attachment 14 may include a number of suitable components for providing a mulching, shredding or cutting function. In this example, the attachment 14 includes a rotatable support rod and a plurality of cutting elements spaced along the support rod. The cutting elements can be formed in any of a number of suitable configurations, such as by providing spaced hammer elements on multiple support rods which are mounted between end plates. Other mulching, cutting or flailing elements connected to a rod or drum or other support can also be utilized, such as flail chains and the like, or such as those elements described in U.S. Pat. No. 4,223,441 and U.S. Pat. No. 4,222,418, which are hereby incorporated by reference herein. The attachment 14 can also be provided with a suitable housing 44, configured to contain the mulch material generated as well as to protect persons and areas near the machine 10. Other safety mechanisms can be also provided, such as guard assembly 46.

Figure 6:
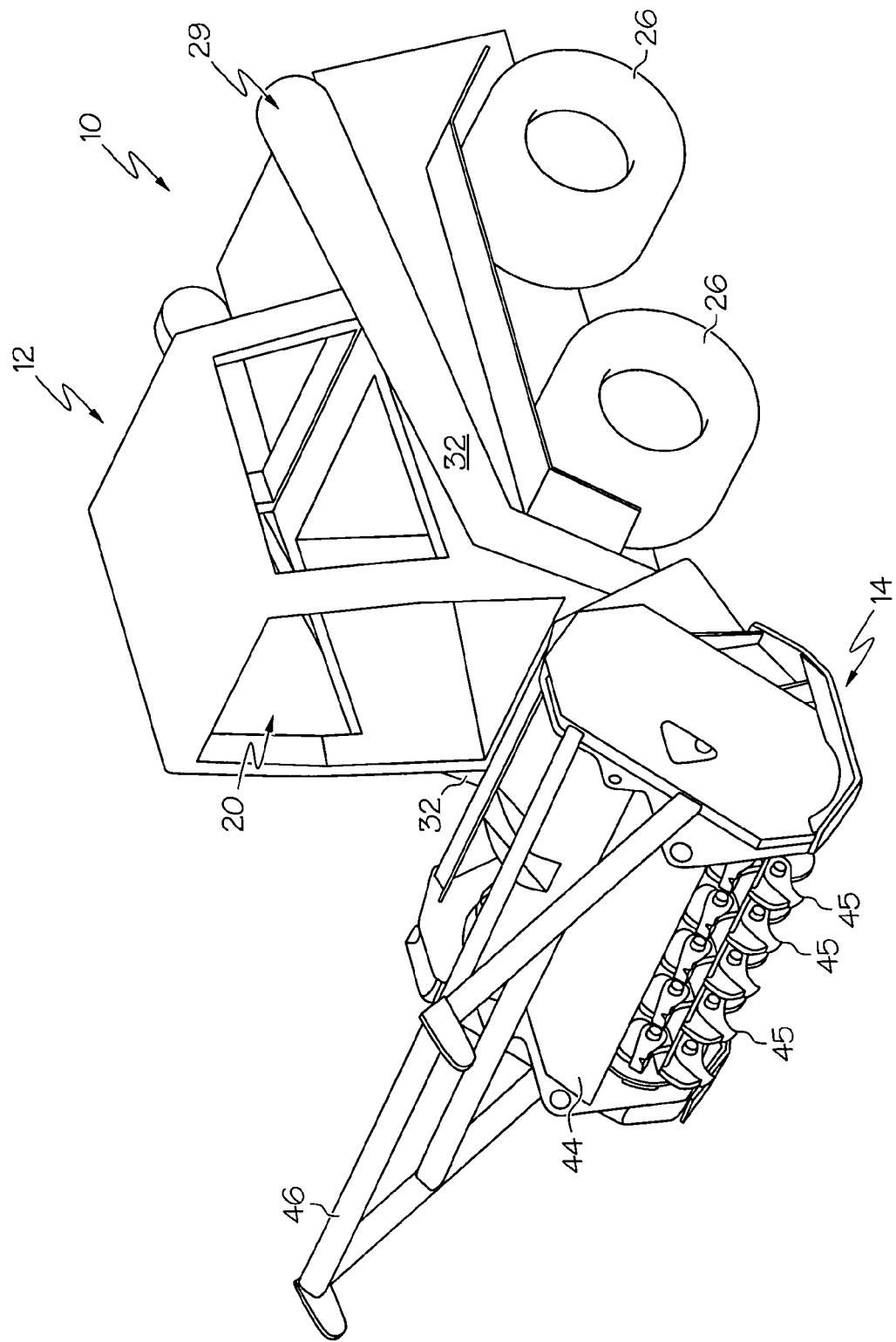
FIG. 6 is a perspective view of another embodiment of a forestry machine that can be utilized with principles of the present inventions, and illustrating examples of cutting elements that can be utilized in the machine.

FIG. 6 is an embodiment of a forestry machine similar to that of FIG. 1 and illustrating examples of cutting elements 45 that can be utilized in a machine having one or more of the inventive aspects. In this example, the cutting elements comprise rotatable blade members. The members may have specialty materials or tips, such as carbide tips, for assistance in cutting.

With reference to FIGS. 1 and 6, for movement of the cutting elements, a hydraulic motor 40, such as a hydraulic piston motor, provides rotation of a rotor (e.g., drive shaft 42) which connects to the cutting element support rod or drum and which thereby causes rapid rotation of the cutting elements, such as at speeds of between about 1000 rpm to about 2200 rpm. Via the controls 22, the hydraulic lift arms 32 raise and lower the attachment 14 to allow its rotating cutting elements to come into contact with brush, trees, vegetation, or other objects to be cut or shredded or cleared. Controls 22 may also control the supply of fluid to the hydraulic motor 40 to start and stop the rotation of the cutting elements.

Figure 2:
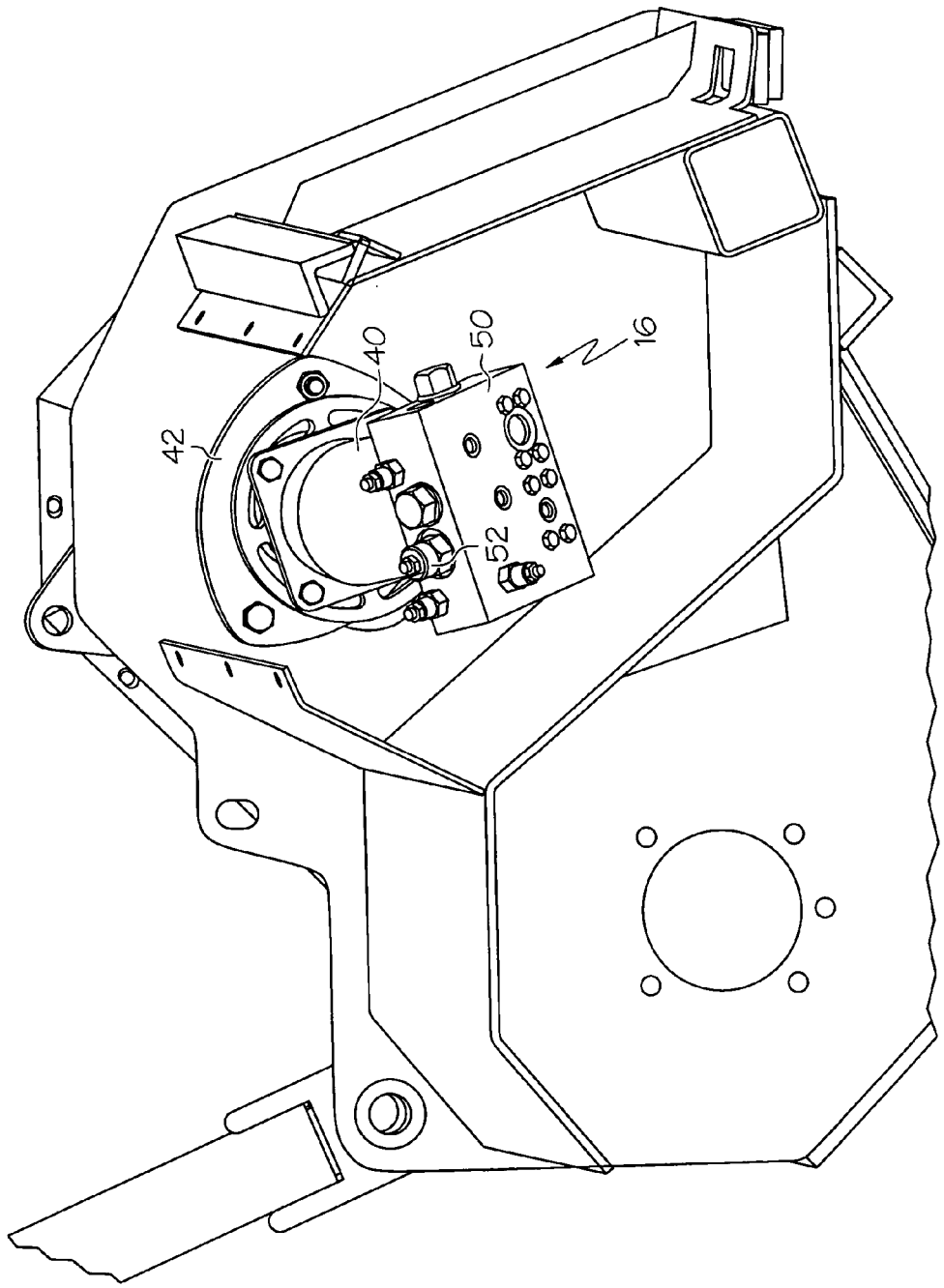
FIG. 2 is a detailed, partial side view of the hydraulic brake and mulching apparatus of FIG. 1.
Figure 3:
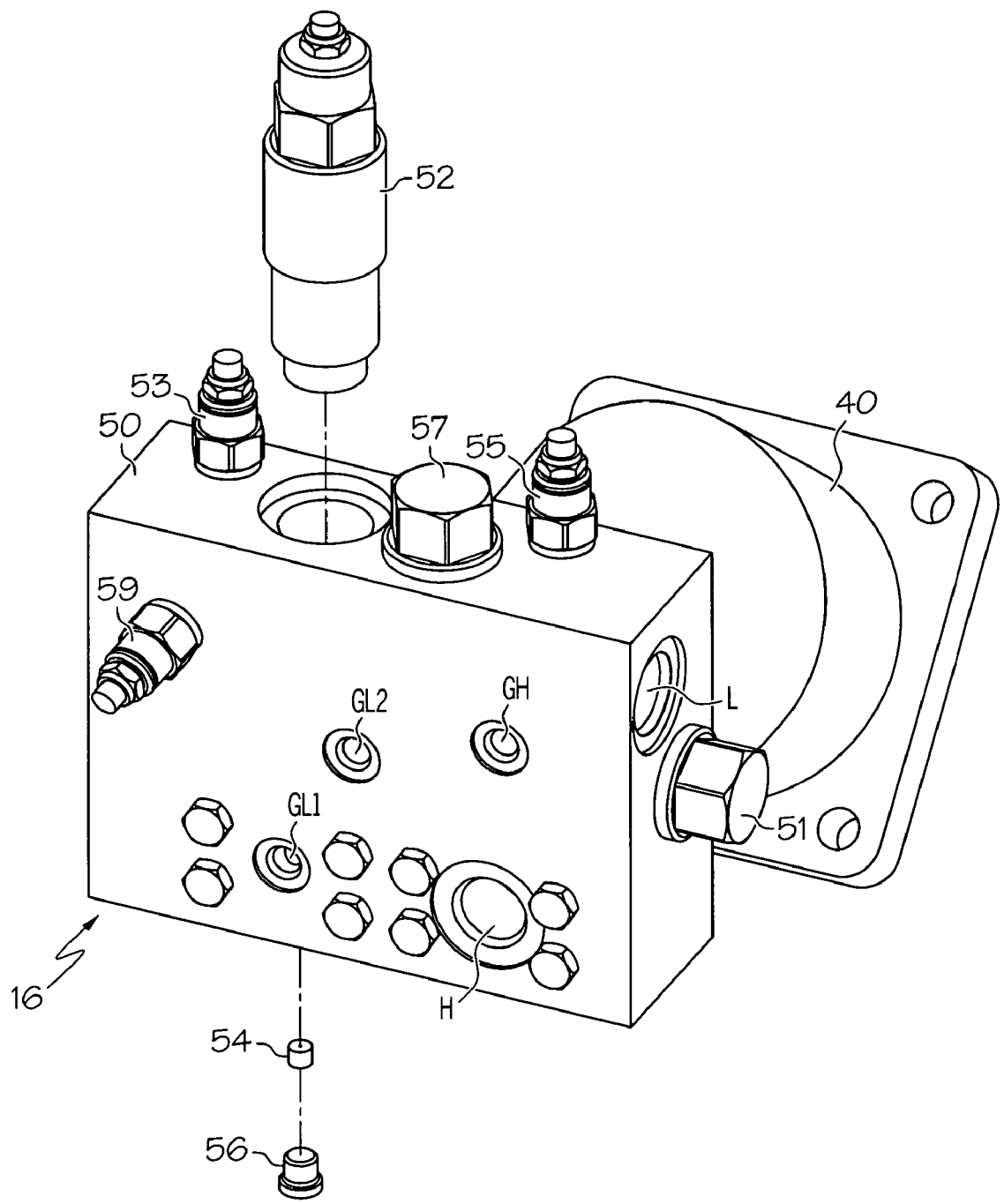
FIG. 3 is an exploded view of the hydraulic brake and hydraulic motor of FIG. 1.

In addition, the hydraulic motor 40 is controlled by a hydraulic brake 16 which automatically slows the motor 40 when the flow of hydraulic fluid to the motor via the hydraulic supply line is discontinued. In this embodiment, and as shown in FIGS. 1-3, the brake 16 includes a metal manifold block 50 having components which control the braking of the motor 40. As will be described in greater detail below, one of the components of brake 16 is a counterbalance valve 52 which includes a passage and is operable to close the passage and to pressurize fluid at the motor 40 outlet to a predetermined pressure level when the flow to the motor is discontinued. In addition, the manifold 50 can include a restrictor orifice which connects the inlet port of the motor 40 to the outlet port of the motor and reduces sudden pressure increases on the motor when a supply of hydraulic fluid to the motor is discontinued and the counterbalance passage is first closed by the counterbalance valve. The motor casing 40 can also receive hydraulic fluid at a casing inlet for cooling of the motor. The motor casing can then be connected to the tank via a casing outlet port on the motor and a case drain line leading to the tank. The tank can reside in the vehicle 12, since many such vehicles are provided with hydraulic pump and tank capability for attachment to hydraulic attachments and/or for powering other hydraulic lifts or actuators on the vehicle. The vent port of the counterbalance valve 52 can be hydraulically connected to the tank via the motor casing inlet, motor casing, motor casing outlet and the case drain line.

In particular, with respect to the embodiment of FIG. 3, the manifold block 50 holds various other components of the braking device. In particular, the block 50 includes a supply port H which receives the pressure from the pump and delivers it to the motor 40. In addition, the manifold 50 includes a return port L that returns fluid from the motor 40 back to the tank. Additional ports GH, GL1 and GL2 can be provided as access points to the manifold, for monitoring or testing or maintenance purposes. Additionally, a sequence valve 53 is provided for providing cooling fluid to the motor 40. Moreover, a relief valve 55 can be provided for relief of high pressure on the motor 40 during operation when it abuts an object. A check valve 51 can also be provided to connect the motor outlet and motor inlet during braking of the motor, and a check valve 57 can be provided to close the passage from the motor outlet to the tank during braking of the motor (During motor operation, these valves allow fluid to flow from the motor outlet to the tank and prevent fluid from flowing from the motor outlet to the motor inlet). Flow control valve 59 can be provided in the manifold block 50 to allow fluid to flow to the motor casing during operation for cooling. In addition, an orifice member 54 (e.g., an element having the desired restrictor orifice size) can be inserted into the manifold 50 into an internal passage within the manifold which allows fluid to flow from the motor outlet to the motor inlet. This passage and the orifice member 54 provide a relief of the high pressure spike that can otherwise result when the braking action begins and before the counterbalance valve can begin its relief valve function. These and other components that can be included in the hydraulic brake 16 will be described in further detail below with respect to FIG. 4

In the example of FIG. 3, mounting bolts can also be provided to connect the manifold 50 to the motor 40 and the mowing apparatus of the forestry machine. In addition, a plug 56 can be provided to allow access to the restrictor passage and the restrictor orifice member 54 within the manifold 50.

Figure 4:
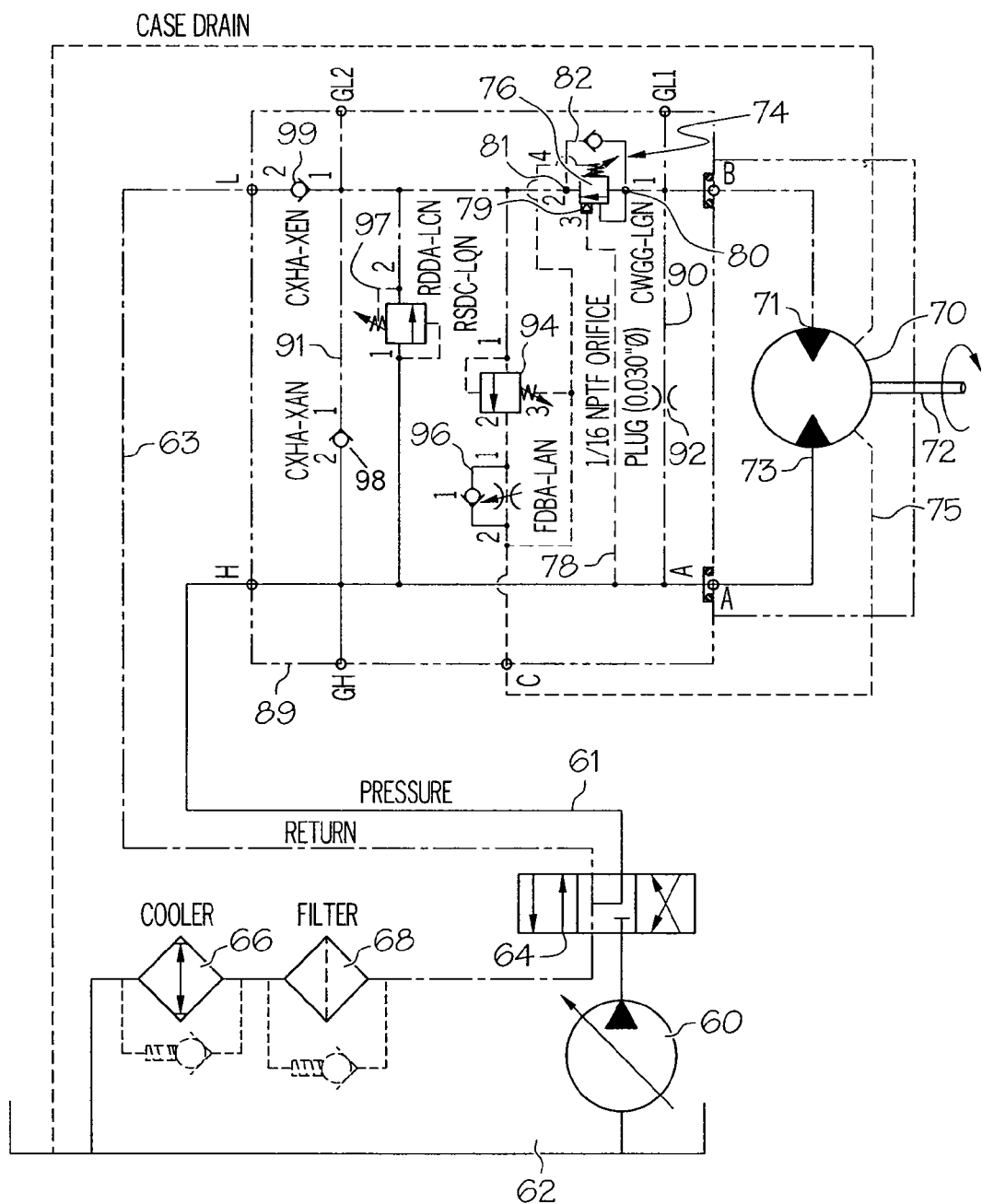
FIG. 4 is a hydraulic circuit diagram showing an embodiment of a hydraulic rotor control system that can be used with the embodiment of FIGS. 1-3 and that is configured and operates according to aspects of the present invention.

FIG. 4 is a hydraulic circuit diagram showing an embodiment of a hydraulic rotor control system that can be used in the embodiments of FIGS. 1-3 and 6 and that is configured and operates according to aspects of the present invention. In this example, the system includes a hydraulic pump 60 for supply of hydraulic fluid to the system via hydraulic supply line 61 as well as a hydraulic tank or reservoir 62 which contains the hydraulic fluid to be supplied and which is returned via hydraulic return line 63. The operation of the pump and the control of the hydraulic fluid supply may be controlled by a control valve. These components may be provided on the forestry vehicle, such as a skid steer vehicle, but other locations of the components may also be utilized. Hydraulic components for handling and processing the fluid in the system can also be provided, such as a cooler 66 for cooling the fluid and a filter 68 for filtering contaminants from the fluid.

The hydraulic motor 70 is supplied the hydraulic fluid via supply line 61 to thereby provided rotational power to rotor 72. A hydraulic brake circuit is also provided in order to slow the rotation of the motor 70 and connected rotor 72 when supply of fluid from pump 60 is discontinued. The brake includes a counterbalance valve 74 positioned along the fluid return line 63 at the motor outlet 71. The counterbalance valve 74 includes a valve port 81 connected to the tank 62 via the return line 63, and a load port 80 connected to the motor outlet 71. During operation of the motor, the counterbalance valve 74 acts as a pilot-operated valve, and includes a passage 76 which allows fluid to flow when the supply of fluid to the motor inlet 73 is permitted, but which becomes closed when the supply of fluid to the motor inlet 73 is discontinued during braking, at which point the valve 74 acts as a relief valve. To control the opening and closing of the passage 76, a pilot line 78 provides fluid from the supply line 61 to the pilot port 79 of the valve 74 which then senses the presence of the fluid pressure via the pilot assist elements and which then allows the passage to open. However, when the flow of fluid is discontinued, the passage is closed and the counterbalance valve 74 acts as a relief valve, maintaining the pressure at the outlet port 71 of the motor 70 at a predetermined level, by opening and closing the passage periodically to maintain the desired pressure as the motor 70 continues to rotate and to cause fluid to flow to the load port 80 of the valve 74. The amount of pressure that causes the valve to open can be adjustable, such as via a screw or hex nut on the valve.

The pressure thereby provided by the counterbalance valve 74 on the motor 70 when the fluid supply is discontinued assists in the braking of the motor and rotor 72, which may be part of the mulching or mowing attachments described above. The braking of the motor thus reduces the risk that the rotating cutting elements will pose a danger to the vehicle operator when the operator exits the vehicle. It has been found that maintaining a braking pressure on the motor of about 2000 psi to about 4000 psi provides optimal braking of the cutting elements in hydraulic rotary mowing apparatus, and in particular a pressure of about 2000 psi may be utilized. It has also been found that the setting of the pilot pressure to cause the valve to open can be set at about 800 psi in such mowing apparatus.

In order to effectively control the pressures in the system, additional components have been provided according to additional principles of the present invention. In particular, a restrictor passage or line 90 may be provided (such as in a metal manifold) with one end having a connection between the motor inlet 73 and the pump 60 and the opposite end having a connection between motor outlet 71 and the load port 80 of the counterbalance valve 74. The restrictor passage 90 may include a restrictor orifice 92, having a maximum cross-sectional dimension of between about 0.025 inches and about 0.04 inches, such as a diameter of about 0.03 inches. It has been found that providing such an orifice optimizes system pressures during braking by the counterbalance valve, and in particular, that the orifice can reduce sudden pressure increases on the motor 70 when the fluid supply from the pump 60 ceases, and the counterbalance valve initially closes to first begin its braking function. If a manifold is utilized to supply some of the braking components, the orifice may be located in the manifold, as has been described above.

The motor 70 can be provided with a casing line 75 which allows for passage of hydraulic fluid through the motor casing for cooling purposes. The fluid may be supplied from the return line 63 through a sequence valve 94 and pressure compensated flow control valve 96. In addition, the vent port 82 on the counterbalance valve 74 can be hydraulically connected to the motor casing drain line 75 on the output side of valve 96. In this way, the vent fluid from the valve 74 can also efficiently and effectively connect to the tank 62, and in particular via the motor casing.

Additional components can also be provided for optimal operation and which can be particularly useful for mowing and mulching apparatus. In particular, a pressure spike release valve 97, such as in the form of a sequence valve, can be connected between the supply line 61 and the return line 63 on the valve port side of the valve 74. This valve can provide a relief of pressure when the motor 70 is powered and the cutting elements first engage an object or they engage an object that is difficult to cut.

In addition, an anticavitation line or passage 91 can be connected between the supply line 61 and the return line 63 at the valve port side 81 of the valve 74. This line 91 can include an anticavitation check valve 98 which permits fluid to flow from the valve 74 back to the inlet 73 of the motor 70 when the braking action of the valve 74 is underway and the valve 74 is discharging fluid while the motor 70 brakes. Additionally, check valve can be configured to prevent the flow of the fluid back to the tank 62 when the fluid from the pump 60 ceases and the counterbalance valve 74 is braking the motor 70. As indicated by the example of FIG. 3, the braking components shown in box 89 can be provided in a metal manifold block for ease of attachment to and/or retrofit of hydraulic motors in forestry machines, although other integrated and separated configurations of the components can be utilized.

In operation, the control valve 64 permits fluid to flow from the pump 60 via the supply line 61 to the motor inlet 73 to thereby cause the motor to rotate and to drive the rotor 72 and the rotatable attachment. Pressure via line 78 provided at the pilot port 79 of the counterbalance valve 74 opens the passage 76 and allows the fluid to flow from the motor outlet 71 through the counterbalance valve 74 and through check valve 99 back to tank 62. During this operation, the motor 70 is cooled via supply of some of the fluid from the valve port 81 of the counterbalance valve 74 through the motor casing line 75, as controlled by valves 94 and 96. Fluid from the vent port 82 of the counterbalance valve 74 is also permitted to flow directly to the motor casing and back to the tank 62. If a sudden increase in pressure is experienced, such as by hitting the mulching elements against a hard object, the valve 97 can allow fluid to flow directly from the supply line 61 to the return line 63 in response to the high pressure, in order to relieve that pressure.

When the operator or machine shifts the control valve 64 to the stop position, the fluid along supply line 61 to the motor 70 is ceased. The counterbalance valve 74 senses this event at its pilot port 79 and closes passage 76 causing pressure on the motor outlet 71. The sudden surge in pressure is minimized via the restrictor passage 90 and orifice 92 which supply some flow back to the motor inlet 73. The counterbalance valve 74 then maintains the desired backpressure on the motor 70 by acting as a pressure relief valve, opening and closing to maintain the pre-set pressure which is indicated by the screw or other setting on the valve. As mentioned, this pressure has been found to be optimally within the 2000 psi to 4000 psi range for mowing and mulching attachments. As fluid periodically flows through the counterbalance valve 74, it is prevented from going to tank 62 by the valve 99, but is permitted to go to the motor inlet 73 by the valve 98 via line 91. Accordingly, damaging cavitation or vacuum pressures are avoided. The pressure on the motor 70 thereby hastens the stopping of the motor and rotor for increased safety, while maintaining optimal system pressures. It has been found that such a system can brake a 2000 rpm rotating flail rotor to a complete stop in approximately 8-10 seconds.

Figure 5:
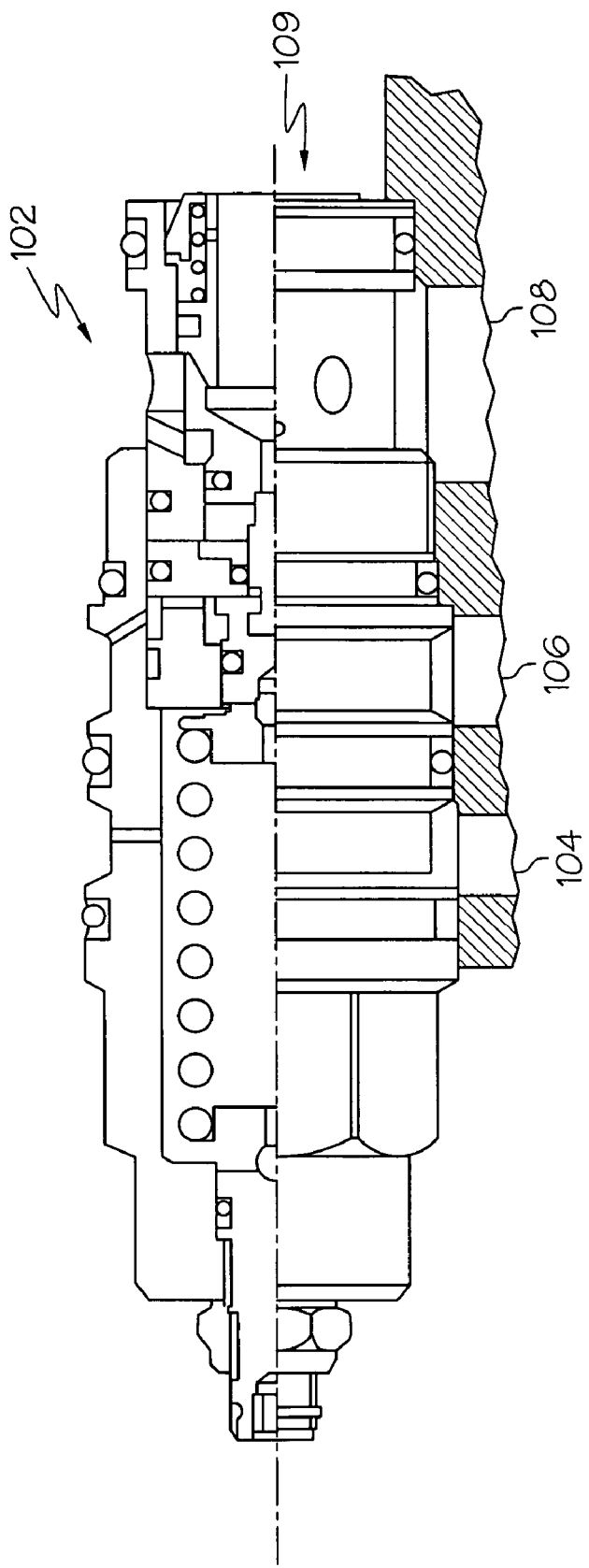
FIG. 5 is a cross-sectional view of a counterbalance valve that may be utilized with the hydraulic brake embodiments of FIGS. 1-4 and 6.

FIG. 5 is a cross-sectional view of an illustrative counterbalance valve that may be utilized with the hydraulic brake embodiments of FIGS. 1-4. In this embodiment, the counterbalance valve 102 is a four port valve that includes a vent port 104, a pilot port 106, an outlet or valve port 108, and an inlet or load port 109. The setting of the activation pressures can be adjusted by a hex nut on the valve, which thereby adjusts the pressure which will activate the internal spring to cause move and cause free flow of fluid around a spool between ports 109 and 108. When the pressure at the pilot port 106 falls below its activation or override setting, then the spring bias overcomes the pressure at the pilot port causing the spool to block the flow of fluid between ports 109 and 108. In the hydraulic braking described above, the valve can then act as a relief valve to open again to release fluid, and then close, to maintain the predetermined pressure. This opening and closing occurs when pressure at port 109 exceeds the counter balance relief valve activation or set pressure, to release high pressure out of the motor. In some embodiments, pressure at port 106 remains at about 15 to 20 psi during this braking of the mowing apparatus.

Accordingly, embodiments of the present invention can provide improved forestry and hydraulic rotary equipment, and embodiments can provide improved hydraulic rotational braking with controlled flow and pressures.

The specific illustrations and embodiments described herein are exemplary only in nature and are not intended to be limiting of the invention defined by the claims. For example, the counterbalance valves disclosed herein may comprise a motion control valve or center valve. Further embodiments and examples will be apparent to one of ordinary skill in the art in view of this specification and are within the scope of the claimed invention.

What is claimed is:

1. A hydraulic rotary forestry machine, comprising
a forestry vehicle including a hydraulic pump and hydraulic controls;
a cutting apparatus hydraulically operated via hydraulic fluid from the hydraulic pump of the vehicle and including:
 a hydraulic motor operable to drive a rotor in a first direction and including a motor inlet and motor outlet;
 a cutting tool mounted on the rotor;
 a fluid circuit comprising at least one fluid supply line operable to supply hydraulic fluid to the hydraulic motor, and at least one fluid return line operable to return fluid from the hydraulic motor to a tank; and
 a hydraulic brake comprising:
  a counterbalance valve arranged in the fluid return line, wherein the counterbalance valve is operable to pressurize fluid at the motor outlet to a predetermined pressure level of between about 2000 psi and about 4000 psi when a flow of hydraulic fluid from the pump to the motor is discontinued, and wherein the counterbalance valve includes a pilot port hydraulically connected to the motor inlet, a valve port hydraulically connected to the tank and configured for supply of hydraulic fluid to the tank during operation of the motor, and a load port hydraulically connected to the motor outlet; and
  at least one valve hydraulically connected to the valve port and operable to direct the flow of fluid from the fluid return line to the at least one fluid supply line when the supply of hydraulic fluid from the pump to the motor is discontinued;
wherein the hydraulic controls are operable to selectively supply hydraulic fluid to the at least one fluid supply line from the pump.

2. The machine as recited in claim 1, wherein the hydraulic brake resides in a metal manifold block detachable from the motor, and the counterbalance valve further includes a vent port routed to the tank via the motor casing.

3. The machine as recited in claim 1, wherein the hydraulic brake includes a restrictor orifice arranged between the motor inlet and the motor outlet and operable to reduce sudden pressure increases on the motor when a supply of hydraulic fluid from the pump to the motor is discontinued.

4. The machine as recited in claim 3, wherein the orifice has a maximum cross-sectional dimension of between about 0.025 and about 0.04 inches.

5. The machine as recited in claim 1, further comprising:
a pressure relief valve configured to relieve pressure at the motor inlet when the cutting tool engages an obstruction to create high pressure at the motor.

6. The machine as recited in claim 1, further comprising:
at least one valve positioned between the fluid return line and the motor casing and operable to provide a cooling supply of fluid to a casing of the motor.

\* \* \* \* \*

UNITED STATES PATENT AND TRADEMARK OFFICE
CERTIFICATE OF CORRECTION

PATENT NO. : 7,621,112 B2
APPLICATION NO. : 11/174244
DATED : November 24, 2009
INVENTOR(S) : Slattery et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1103 days.

Signed and Sealed this

Twenty-sixth Day of October, 2010

David J. Kappos
*Director of the United States Patent and Trademark Office*